United States Patent
Shepard et al.

[11] Patent Number: 5,228,780
[45] Date of Patent: Jul. 20, 1993

[54] DUAL-MODE SELF-VALIDATING RESISTANCE/JOHNSON NOISE THERMOMETER SYSTEM

[75] Inventors: Robert L. Shepard, Oak Ridge; Theron V. Blalock; Michael J. Roberts, Knoxville, all of Tenn.

[73] Assignee: Martin Marietta Energy Systems, Inc., Oak Ridge, Tenn.

[21] Appl. No.: 969,057

[22] Filed: Oct. 30, 1992

[51] Int. Cl.⁵ .................... G01K 7/30; G01K 7/16
[52] U.S. Cl. .................... 374/175; 374/183
[58] Field of Search .......... 374/175, 183, 185; 338/28

[56] References Cited

U.S. PATENT DOCUMENTS

| | | | |
|---|---|---|---|
| 3,818,761 | 6/1974 | Brixy et al. | 374/175 |
| 3,878,723 | 4/1975 | Blalock et al. | 374/175 |
| 3,890,841 | 6/1975 | Brixy | 374/175 |
| 3,937,086 | 2/1976 | Von Thuna | 374/175 |
| 3,956,936 | 5/1976 | Brixy | 374/175 |
| 4,099,413 | 7/1978 | Ohte et al. | 374/175 |
| 4,278,828 | 7/1981 | Brixy et al. | 374/175 |
| 4,322,725 | 3/1982 | Annetts | 374/175 |
| 4,627,744 | 12/1986 | Brixy et al. | 374/175 |

FOREIGN PATENT DOCUMENTS

| | | | |
|---|---|---|---|
| 195161 | 9/1967 | U.S.S.R. | |
| 0460455 | 2/1975 | U.S.S.R. | 374/175 |
| 0488093 | 10/1975 | U.S.S.R. | 374/175 |
| 0781609 | 11/1980 | U.S.S.R. | 374/175 |

Primary Examiner—William A. Cuchlinski, Jr.
Assistant Examiner—Diego F. F. Gutierrez
Attorney, Agent, or Firm—Harold W. Adams; James M. Spicer; Edward A. Pennington

[57] ABSTRACT

A dual-mode Johnson noise and DC resistance thermometer capable of use in control systems where prompt indications of temperature changes and long term accuracy are needed. A resistance-inductance-capacitance (RLC) tuned circuit produces a continuous voltage signal for Johnson noise temperature measurement. The RLC circuit provides a mean-squared noise voltage that depends only on the capacitance used and the temperature of the sensor. The sensor has four leads for simultaneous coupling to a noise signal processor and to a DC resistance signal processor.

14 Claims, 1 Drawing Sheet

DUAL-MODE SELF-VALIDATING RESISTANCE/JOHNSON NOISE THERMOMETER SYSTEM

This invention was made with Government support under contract DE-AC05-84OR21400 awarded by the U.S. Department of Energy to Martin Marietta Energy Systems, Inc. and the Government has certain rights in this invention.

FIELD OF THE INVENTION

The present invention relates generally to measuring and testing and, more particularly, to a Johnson noise thermometer which simultaneously measures DC resistance and Johnson (AC) noise on a single resistor. The dual mode aspect of the thermometer eliminates electrical switching of the resistor leads.

BACKGROUND OF THE INVENTION

Johnson noise, or thermal noise, is the noise produced by thermal agitation of charges in a conductor. The available thermal noise power produced in a resistance is independent of the resistance value and is proportional to the absolute temperature and the frequency bandwidth over which the noise is measured.

Johnson noise thermometers have been used to measure absolute temperatures, and have the advantage that they are independent of the materials or the past history of the sensing resistors. Moreover, they are drift free and are characteristically linear thermometers.

Johnson noise thermometers are not, however, without drawbacks. For example, they require highly sensitive, low-noise wide-band amplifiers and are subject to electromagnetic (non-thermal noise) interference. They are also susceptible to microphonic noise generated by vibration and are affected by characteristics of their lead wires and require an appreciable time for noise signal integration to obtain an accurate indication of temperature.

Johnson noise thermometers have been used to measure temperature in nuclear reactors, as well as in nuclear fuel irradiation tests and for in situ calibration of resistance thermometers. The use of Johnson noise thermometers in space nuclear applications requires that the thermometer operate unattended, reliably, and with good accuracy (<1% uncertainty) at high temperatures (about 1400K) for at least 7 years at full power. Requirements on the sensor include compatibility with space nuclear environments, modest radiation resistance, vibration and EMI resistance, continuity reliability, and relatively fast time response (<8 seconds).

A remotely operated Johnson noise thermometer system can provide very long term drift-free temperature indications since it is unaffected by changes in the sensor's resistance, within limits. However, the delay in acquiring an accurate temperature, due to the need to integrate a noise signal for a fixed period of time (e.g. 1 second or 10 seconds) limits the value of the noise measurement for fast control systems.

It is expected that a high-temperature resistance thermometer would read inaccurately due to shunting of the measuring current through the insulation material which supports and insulates the metal resistance winding and due to changes in the sensor's properties after long time exposure to high temperatures. Any effects of long term drift of the sensor would be corrected by the use of the Johnson noise temperature measurement. In most applications, this problem of insulator shunting is less significant for the Johnson noise thermometer than it is for the DC resistance thermometer.

Long term drift free operation requires that the gain, bandwidth, and noise contribution of the noise signal processor be validated. Conventional methods for validating the characteristics of the noise signal processor in such locations as the laboratory where the processor is accessible require that the sensor be disconnected from the signal processor and that it be replaced by known noise signal sources. In remote applications, switches could perform the signal substitution, but most switches used for this purpose that could control the low-level input signals to the noise signal processor are either noisy or unreliable or both.

U.S. Pat. No. 3,878,723 to Blalock et al. describes a thermal noise power thermometer in which temperature is determined as a function of thermal noise voltage and thermal noise current sensed by a resistor. Both voltage and current are sensed by two preamplifiers.

U.S. Pat. No. 4,099,413 to Ohte et al. describes a thermal noise thermometer. A resistor is supplied with shot noise which produces a DC and an AC output.

U.S. Pat. No. 4,627,744 to Brixy et al. describes a thermometer which uses a resistive, Johnson noise element and a thermocouple.

In spite of the above-noted systems of the prior art, a continuing need exists for an improved thermometer system which is highly accurate and reliable over long periods of time.

SUMMARY OF THE INVENTION

An object of the present invention is to provide a thermometer system that uses the temperature-resistance behavior of a resistive sensor measured in the DC current-potential mode for rapid and continuous signal response.

Another object of the present invention is to provide a thermometer system whose accuracy is validated continuously by Johnson noise measurements for long-term drift stability.

Another object of the present invention is to provide a thermometer system capable of providing means for periodically validating the gain, bandwidth, and noise contribution of the signal processor without using unreliable noisy relays and switches in the low-level input to the signal processor.

Still another object of the present invention is to provide a method of verifying the noise signal processor characteristics of gain, bandwidth, and noise contribution by relying only on switch closures to short-out components of an RLC tuned circuit.

These and other objects of the invention are met by providing a temperature measuring system which includes a sensor having a resistor, first signal processor means, having a current source constantly coupled to the sensor, for continuously producing a first temperature signal based on the DC resistance of the sensor resistor, and second signal processor means, coupled to the sensor, for continuously producing a second temperature signal based exclusively on the AC Johnson noise generated by the sensor resistor, whereby the sensor simultaneously independently measures DC resistance and AC Johnson noise. Preferably the system further includes control means, receiving the first and second signals, for validating the resistance-temperature relationship established by the second signal processor means.

Other objects, advantages and salient features of the invention will become apparent from the following detailed description, which taken in conjunction with the annexed drawings, discloses preferred embodiments of the invention.

DETAILED DESCRIPTION OF THE INVENTION

Figure 1:
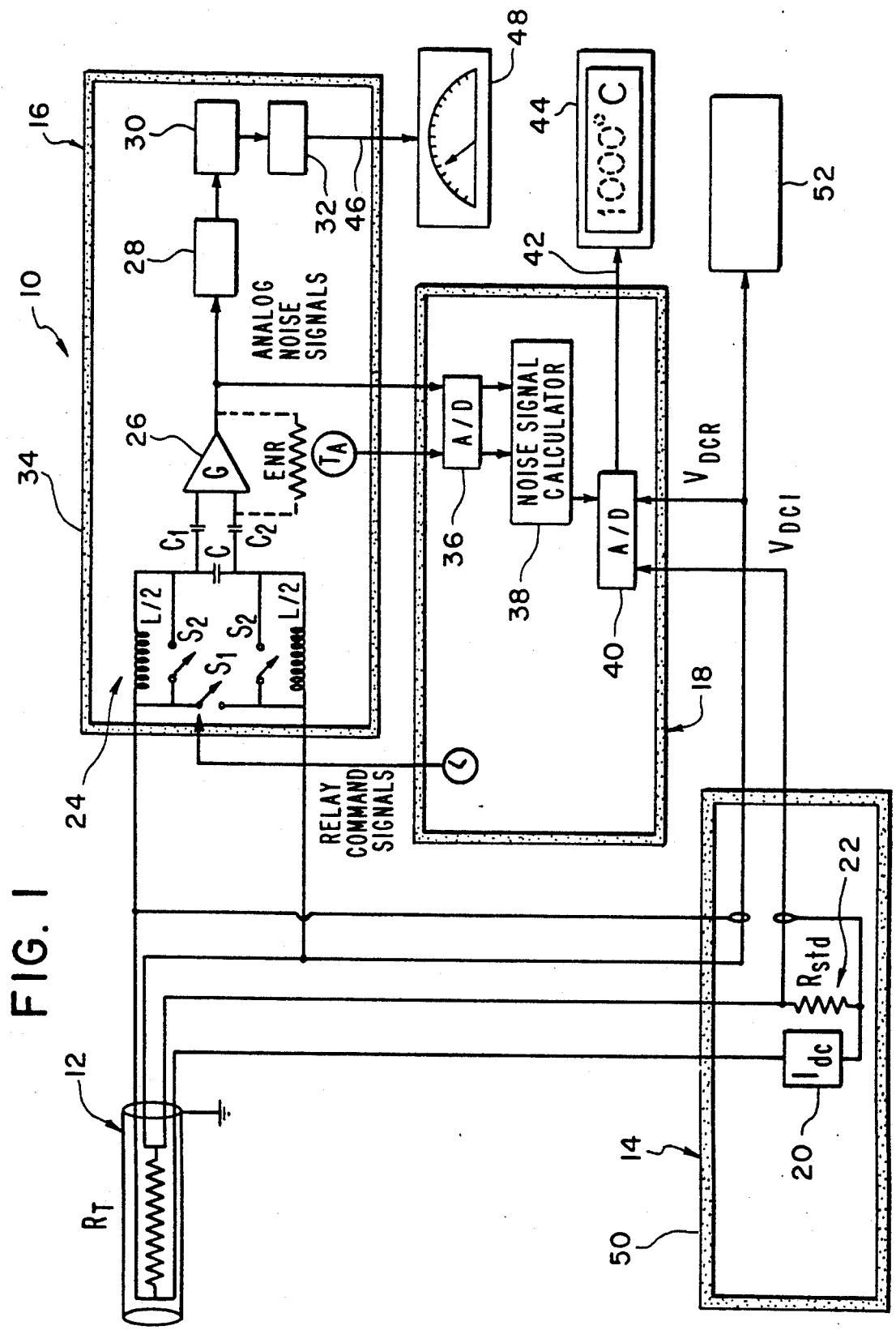
FIG. 1 is a schematic view of a preferred embodiment of a single-sensor, dual-mode, self-validating thermometer system according to the present invention.

Referring to FIG. 1, a thermometer system 10 includes a four-lead sensor 12, a first signal processor 14, a second signal processor 16, and a controller 18. The sensor 12 is a four-wire resistor which has a room temperature resistance of more than a few tens of ohms, such as 100$\psi$, and a resistance-temperature relationship approximating that of most pure metals, such as platinum, niobium, rhenium, copper, tungsten, etc.

The sensor 12 is typically a metal-sheathed, oxide insulated resistance thermometer such as the standard, commercially available platinum resistance thermometers widely used in the nuclear and fossil power plants. Other materials could be used instead of platinum. The metal sheath is shown to be grounded to reduce electromagnetic and radio frequency interference.

The first signal processor 14 measures DC resistance of the sensor 12. The processor includes a current source 20 (Idc) which supplies a stable, low-noise DC current of about 0.1 to 1 mA. The source 20 is connected in series with a standard resistor 22 (Rstd) and to two of the four leads of the sensor 12. The potential drop across the standard resistor 22 is provided to the controller 18 so that the DC current flowing through the sensor 12 can be accurately measured. The remaining two leads of the four wires of the sensor 12 measure the potential drop across the sensor and are provided to the controller 18. Thus, the signal processor 14 generates a constant DC current of a few milliamperes from a low noise source, measures the potential drop across a standard resistor in series with the sensor resistance using two of the four leads to obtain the sensor current, and measures the potential drop across the sensing resistor using the remaining two leads to provide data for determining the sensor resistance.

Two of the leads from the sensor 12 are attached to the second signal processor 16 in order to measure Johnson noise. These are the same two leads as used for potential drop measurement in the DC resistance measurement. The two leads are coupled to a tuned RLC circuit 24, one each being connected to each half of a split inductor L/2, which is then connected to the terminals of a capacitor C, thus defining the series-connected tuned RLC circuit 24 with the resistive sensor 12. The tuned circuit 24 is resonant at a frequency of a few tens of kilohertz and produces a low-level noise voltage (Vrms), measured across the capacitor C, that is given by Vrms=$\sqrt{[kT/C]}$, where C is the capacitance of the capacitor, T is the absolute temperature of the sensor, and k is a constant. Only one stochastic measurement (Vrms) is needed to determine the temperature and it is not affected by the resistance of the sensor or the value of the inductor (within limits).

The AC noise voltage signal developed across the capacitor C is AC coupled to the input of a high-gain low-noise broadband preamplifier 26. AC coupling is provided by two small capacitors c1 and c2 which block the DC current used to measure the sensor's DC resistance, from the preamplifier, and avoid shunting the DC potential drop across the sensor's resistance by the input resistance of the preamplifier, which in any case is very high. The preamplifier 26 is connected in a differential input configuration for which neither of the input terminals are grounded. This differential input configuration for a preamplifier is conventional for voltage amplifiers but has not been used for low-input noise current measurements.

The preamplifier 26 is a differential voltage amplifier having a gain characteristic G, an equivalent noise resistance ENR and a temperature Ta. These characterize the preamplifier's contribution to the remaining sections of the noise processor, which include the amplifier 28, filter 30 and multiplier 32. The output from the preamplifier 26 is amplified, filtered, and converted with the amplifier 28, filter 30 (or filters) and multiplier 32 into a DC equivalent signal that represents the rms noise developed in the tuned circuit 24 which is proportional to the absolute temperature of the sensor 12. This processor noise signal depends on the temperature and the components in the first or preamplifier stage of the signal processor 16. The equivalent noise resistance (ENR) and the temperature of the preamplifier determine the noise contribution of the signal processor 16. The inductors L/2, capacitor C and the preamplifier 26 are all contained in a common isothermal enclosure 34 whose temperature is controlled and is measured using an ordinary thermistor or semiconductor temperature sensor.

The input section of the noise signal processor 16 contains three remotely actuated switches or relays S1 and S2 that are actuated by relay command signals issuing from the controller 18. These switches, which may be called "crowbar" switches, may be actuated to short out (S2) either or both sections of the split inductor L/2, or the sensing resistor (S1) to produce up to eight different circuit configurations (not all of which are independent) that provide different noise voltage signals to the input of the differential preamplifier, which can then be analyzed to separate the noise signal contributions of the sensor and the preamplifier. The switches permit the noise signal output to be measured under at least the following circuit configurations: (1) with all switches open, the sensor noise temperature in the RLC circuit configuration, (2) with the sensor shorted, the contributions of the inductor, capacitor, and signal processor, (3) with the inductor shorted, a series RLC tuned circuit provides the contributions of the sensor, capacitor and signal processor, and (4) with both sensor and inductor shorted, the signal contributed only by the capacitor and the signal processor. Additional switches can provide additional configurations which would be redundant.

The computer or controller 18 actuates preprogrammed relay closures for validating the noise signal processor 16, performs routine conversion of the DC voltage drop to obtain the sensor DC resistance, converts the DC resistance to a sensor temperature, updates the calibration conversion based on previous noise temperature measurements, provides an analog or digital output signal to a temperature indicator or controller, obtains a DC signal from the thermistor in the noise signal processor that indicates the preamplifier temperature, acquires and processes the measured parameters for determining the gain, bandwidth and noise contribution characteristics of the noise signal processor and the resistance of the sensor, and finally computes a validated upgrade of the sensor temperature indicated by the DC resistance measurement which is then used to tune or reset the analog or digital output control signal. All relays are designed to fail open-circuit to ensure continued ability to make noise temperature measurements even if they cannot be validated. In the normal temperature measuring mode of operation of the noise signal processor, all of the switches are in the deactivated, normally open configuration so that any possible noise from their contacts is not included in the noise measurement.

Signals provided to the controller 18 are in analog form and represent the temperature of the preamplifier (Ta) from a thermistor, for example, and the output analog noise signal from the preamplifier 26. The analog signals are converted to digital signals in an analog to digital (A/D) converter 36 and then processed by a noise signal calculator 38 which computes and corrects for the preamplifier noise contribution. This corrected digital representation of the sensor noise is combined with the digital representation of the sensor's DC temperature resistance, provided by an another A/D converter 40, to provide the prompt digital R(T) control signal (corrected) 42 to an appropriate temperature display 44 or to the monitored system's control. A delayed DC analog noise signal output 46 is also displayed on a separate analog display 48.

In operation, the system 10 produces a continuous low-noise DC current of about 0.1 mA for the sensor 12 and measures the voltage drop across the sensor. The voltage drop across a standard resistor 22 in series with the sensor 12 and housed in a common isothermal enclosure 50, is measured to determine the precise value of the DC current. The DC voltage drop signal is provided in real time to a temperature display 52 or to a system to be controlled. With the DC current flowing through the sensor 12, the thermal noise generated in the sensor 12 is measured by the noise voltage drop across the tuned circuit capacitor C. This noise signal is acquired and integrated for a fixed interval of time and its DC equivalent value is then provided to the controller 18. At some predetermined interval or on external demand, the controller directs relay closures in sequence to produce specific noise voltages that can be used to validate the amplifier parameters. During these switch closure episodes, the DC voltage measurement may be disabled or clamped to retain the last previous valid temperature indication during the validation process. Each of these voltages is stored and processed in the controller 18. The solution of the equations that represent the noise voltage for each configuration of the tuned circuit caused by the relay actuation is then used to validate the contribution of the preamplifier to the noise temperature indicated by the sensor 12.

Three output signals are thus provided by the present system. The first is the prompt and continuous analog DC sensor resistance signal (uncorrected) whose temperature relationship is constantly updated and stored in the controller 18. The next signal is the prompt DC resistance/temperature signal that has been corrected for the measured noise temperature, which is displayed at display 44. The third signal is the integrated noise temperature signal, displayed in analog form directly, which is compared with the uncorrected, prompt analog DC resistance signal. The controller 18, which is essentially a programmable computer, can be programmed to perform the corrections automatically and continually.

The use of crowbar switches to alter the circuit configuration to the input of the signal processor preamplifier 26 and thus to verify the gain bandwidth and noise contribution of the preamplifier could be replaced by using a supplementary measurement of the noise voltage signal at a frequency very much higher than the tuned-circuit center frequency where the noise contribution from the sensor and tuned circuit is minimal, but is produced mainly from the noise generated by the preamplifier 26. This approach would require additional amplifiers and filters that would process the higher frequency used for the preamplifier noise measurement. The noise contribution of the preamplifier could then be subtracted by analog or digital means from the noise produced by the sensor 12 and the amplifier, leaving only the desired sensor noise signal.

The concept of the present invention could also be applied to systems employing a parallel RLC or a transformer-coupled RLC tuned circuit in the noise signal processor. Moreover, the DC resistance measuring circuit could be replaced by an AC resistance measurement circuit using a narrow-band current that did not interfere with the tuned-circuit measurements.

The present invention uniquely operates the sensor 12 simultaneously in a DC resistance mode and an AC noise signal mode. This approach minimizes the number of reliable switch closures that must be made. This system uses the dual-mode to provide prompt DC signals to a system controller and verifies the DC signals by integrated AC noise signals. Moreover, the present invention can be used to monitor continuous DC levels and the occasional AC noise signals to identify the presence of intermittent noise in the AC signals that may be induced into the sensor, and thus indicate that the noise signal should be disregarded.

A further unique aspect of the present invention is to provide a method of verifying the noise signal processor characteristics of gain, bandwidth, and noise contribution by relying only on switch closures to short-out components on the RLC tuned-circuit.

While advantageous embodiments have been chosen to illustrate the invention, it will be understood by those skilled in the art that various changes and modifications can be made therein without departing from the scope of the invention as defined in the appended claims.

What is claimed is:

1. A temperature measuring system comprising:
   a sensor having a resistor;
   first signal processor means, having a current source constantly coupled to the sensor, for continuously producing a first temperature signal based on the DC resistance of the sensor resistor; and
   second signal processor means, coupled to the sensor, for continuously producing a second temperature signal based exclusively on the a.c. Johnson noise generated by the sensor resistor, said sensor simultaneously and independently measuring DC resistance and AC Johnson noise voltage.

2. A temperature measuring system according to claim 1, further comprising control means, receiving the first and second signals, for validating the resistance-temperature relationship established by the second signal processor means.

3. A temperature measuring system according to claim 1, wherein the sensor is a four-wire resistor having a room temperature resistance of more than a few tens of ohms, and a resistance-temperature relationship approximating that of most pure metals.

4. A temperature measuring system according to claim 3, wherein the sensor is a metal-sheathed, electrically grounded oxide insulated resistance thermometer.

5. A temperature measuring system according to claim 3, wherein the first signal processor means comprises means for generating a constant DC current of a few milliamperes from a low noise source, means for measuring the potential drop across a standard resistor in series with the sensor resistance using two of the four leads to obtain the sensor current, and means for measuring the potential drop across the sensing resistor using the remaining two leads to provide data for determining the sensor resistance.

6. A temperature measuring system according to claim 3, wherein the second signal processor -means includes a split inductor, each half of which is connected to the terminals of a capacitor, thus defining a series-connected tuned RLC circuit with the sensor.

7. A temperature measuring system according to claim 6, wherein the tuned circuit is resonant at a frequency of a few tens of kilohertz and produces a low-level noise voltage measured across the capacitor.

8. A temperature measuring system according to claim 6, wherein the a.c. noise voltage signal developed across the capacitor is a.c. coupled to the input of a high-gain low-noise broadband preamplifier.

9. A temperature measuring system according to claim 8, wherein the second signal processor means further includes two coupling capacitors which block the DC current used to measure the sensor's DC resistance from the preamplifier, and avoid shunting the DC potential drop across the sensor's resistance by the input resistance of the preamplifier, the preamplifier being connected in a differential input configuration for which neither of the input terminals is grounded.

10. A temperature measuring system according to claim 8, wherein the second signal processor means includes switch means, actuated by command signals issuing from a control means, for shorting out either or both sections of the split inductor, or the sensor to produce a plurality of different circuit configurations that provide different noise voltage signals to the input of the differential preamplifier, which can then be analyzed by the control means to separate the noise signal contributions of the sensor and the preamplifier.

11. A temperature measuring system according to claim 10, wherein the control means includes means for actuating preprogrammed relay closures for validating parameters of the second signal processor means, means for performing routine conversion of the DC voltage drop to obtain the sensor DC resistance, means for converting the DC resistance sensor temperature, means for updating a calibration conversion based on previous noise temperature measurements, means for providing one of an analog and digital output signal to a temperature indicator or controller, means for obtaining a DC signal indicative of the temperature inside the second signal processor means that indicates the preamplifier temperature, means for acquiring and processing the measured parameters for determining the gain, bandwidth and noise contribution characteristics of the second signal processor means and the resistance of the sensor, and means for computing a validated upgrade of the sensor temperature indicated by the DC resistance measurement which is then used to tune or reset the analog or digital output control signal.

12. A temperature measuring system according to claim 8, wherein the inductor, capacitor and the preamplifier are contained in a common isothermal enclosure whose temperature is controlled and is measured.

13. A dual-mode self-validating resistance/Johnson noise thermometer system comprising:
- a four-lead resistive sensor constantly supplied with DC current from a supply to provide a DC potential;
- means for continuously measuring the DC potential and correlating the measured DC potential to a sensed temperature at the resistive sensor, said potential varying in accordance with variations in temperature at the resistive sensor; and
- an RLC tuned circuit series connected to the resistive sensor, said RLC tuned circuit series continuously and exclusively measuring noise voltage, said noise voltage varying in accordance with variations in temperature at the resistive sensor, said resistive sensor simultaneously and independently measuring the DC potential and the noise voltage.

14. A dual-mode self-validating resistance/Johnson noise thermometer system according to claim 13, further comprising computer means for providing periodic absolute temperature calibration of the DC potential sensed temperature.

* * * * *